(12) United States Patent
Maaref et al.

(10) Patent No.: US 10,560,834 B2
(45) Date of Patent: Feb. 11, 2020

(54) SYSTEM AND METHOD FOR DIFFERENTIAL PEAK SIGNALING

(71) Applicant: Huawei Technologies Co., Ltd., Shenzhen (CN)

(72) Inventors: Amine Maaref, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/919,981

(22) Filed: Mar. 13, 2018

(65) Prior Publication Data

US 2018/0206106 A1 Jul. 19, 2018

Related U.S. Application Data

(63) Continuation of application No. 14/488,183, filed on Sep. 16, 2014, now Pat. No. 9,936,369.

(51) Int. Cl.

| | |
|---|---|
| *H04W 8/00* | (2009.01) |
| *H04W 76/14* | (2018.01) |
| *H04W 4/70* | (2018.01) |
| *H04L 5/00* | (2006.01) |
| *H04L 27/26* | (2006.01) |

(52) U.S. Cl.
CPC .......... *H04W 8/005* (2013.01); *H04L 5/0007* (2013.01); *H04L 5/0016* (2013.01); *H04L 5/0053* (2013.01); *H04L 27/2613* (2013.01); *H04W 4/70* (2018.02); *H04W 76/14* (2018.02)

(58) Field of Classification Search
None
See application file for complete search history.

(56) References Cited

U.S. PATENT DOCUMENTS

| | | |
|---|---|---|
| 2009/0017801 A1 | 1/2009 | Laroia et al. |
| 2011/0268101 A1 | 11/2011 | Wang et al. |
| 2011/0305179 A1 | 12/2011 | Wang et al. |
| 2013/0083769 A1 | 4/2013 | Qu et al. |
| 2013/0163555 A1 | 6/2013 | Turtinen et al. |
| 2015/0351020 A1 | 12/2015 | Lin et al. |
| 2017/0013628 A1 | 1/2017 | Kim et al. |

FOREIGN PATENT DOCUMENTS

| | | |
|---|---|---|
| CN | 103039120 A | 4/2013 |
| WO | 2014126514 A1 | 8/2014 |

OTHER PUBLICATIONS

Cidon, et al., "Flashback: Decoupled Lightweight Wireless Control," ACM SIGCOMM 2012 Conference on Applications, technologies, architecture, and protocols for computer communications, Oct. 2012, 12 pages.

(Continued)

*Primary Examiner* — Robert M Morlan
(74) *Attorney, Agent, or Firm* — Slater Matsil, LLP

(57) ABSTRACT

A system and method of operating a device in a wireless communication network including a plurality of user equipment UEs and a BS, including a first device generating a signaling message defining resource elements (REs) as an encoded time slot (TS) and subcarrier pairing. A subset of the REs is encoded, such as to create a discovery signal configured to enable discovery of the first UE by a second UE or the BS. The UE is configured to engage in device-to-device communications, including device centric UEs operable in 5G networks.

20 Claims, 3 Drawing Sheets

(56) References Cited

OTHER PUBLICATIONS

Gopinath, "Nonlinear Recovery of Sparse Signals from Narrowband Data," ICASSP, Date of Conference May 9-12, 1995, 3 pages.
Hong, et al., "Analysis of Device-to-Device Discovery and Link Setup in LTE Networks," 2013 IEEE 24th International Symposium on Personal, Indoor and Mobile Radio Communications: Mobile and Wireless Networks, Date of Conference Sep. 8-11, 2013, 5 pages.
Wang et al., "Discovery Signal Design and Its Application to Peer-to-Peer Communications in OFDMA Cellular Networks," IEEE Transactions on Wireless Communications, submittedon Sep. 5, 2012 version 1, and revised on May 7, 2013, 14 pages.
Wu, et al., "FlashLinQ: A synchronous Distributed Scheduler for Peer-to-Peer Ad Hoc Networks," IEEE/ACM Transactions on Networking, vol. 21, Issue: 4, Aug. 2013, 8 pages.

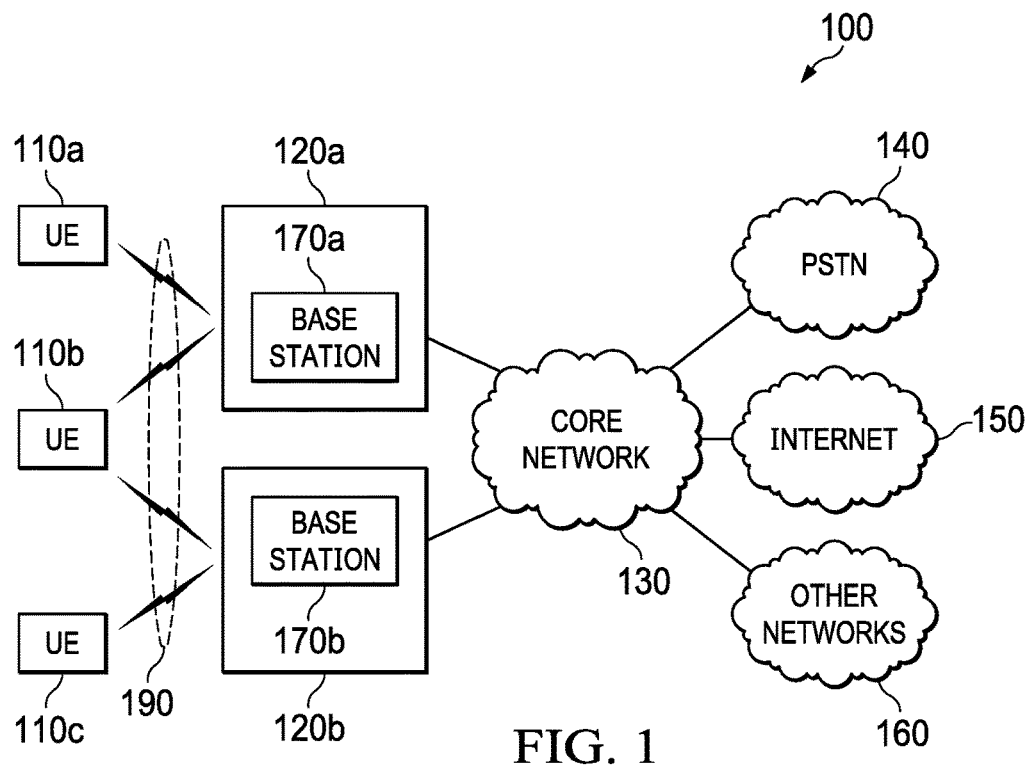
FIG. 1
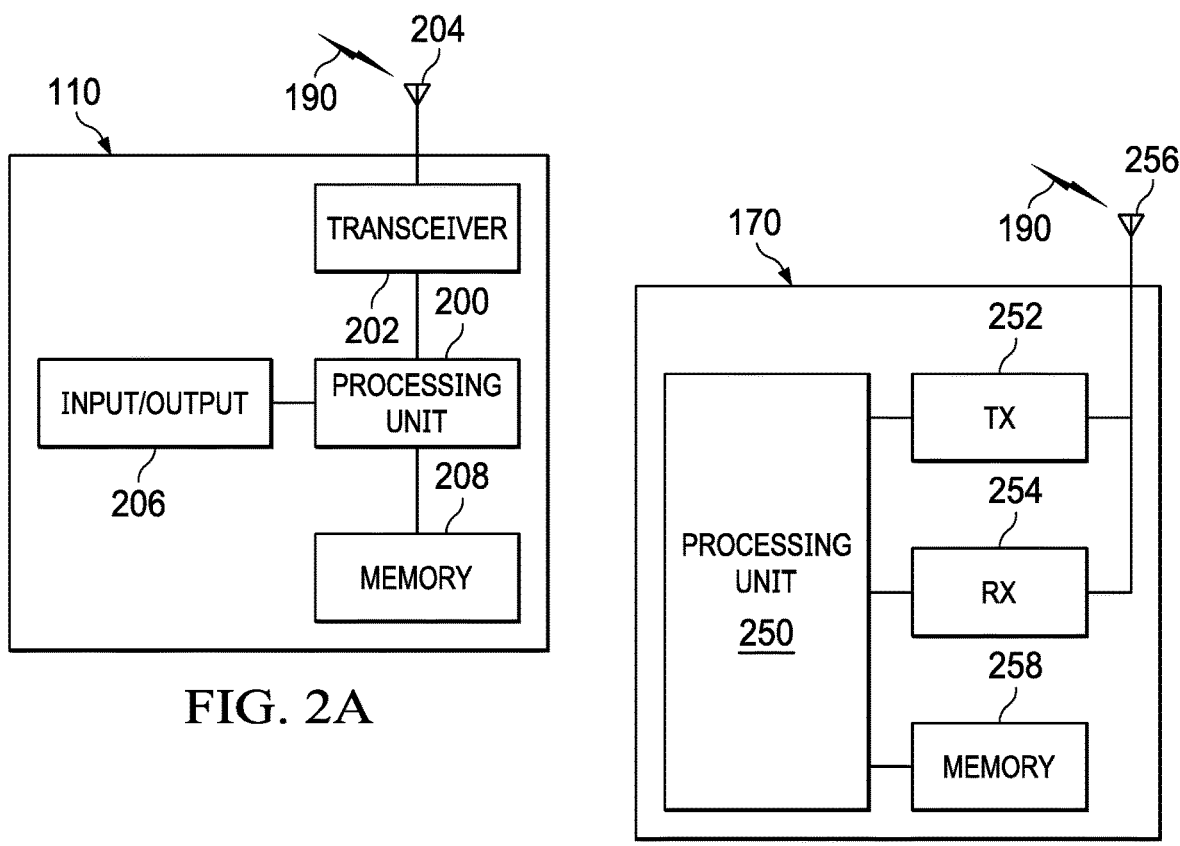
FIG. 2A
FIG. 2B

SYSTEM AND METHOD FOR DIFFERENTIAL PEAK SIGNALING

This patent application is a continuation of U.S. patent application Ser. No. 14/488,183, filed on Sep. 16, 2014 and entitled "System and Method for Differential Peak Signaling," which is hereby incorporated by reference herein as if reproduced in its entirety.

TECHNICAL FIELD

The present disclosure is generally directed to network communications, and more particularly to signaling messages, such as to enable network discovery of neighboring devices and device-to-device (D2D) connectivity in wireless networks, such as 5G networks.

BACKGROUND

A mobile device in mobile and non-mobile communication networks is commonly referred to as user equipment (UE). UE cooperation enabled by device-to-device (D2D) connectivity has been identified as an integral part of a fifth generation (5G) radio access virtualization framework.

Direct mobile communication between two UEs requires that the UEs and/or the network (NW) "discover", i.e. detect the presence of neighboring devices which can be identified as potential helpers in virtualized radio access networks.

For 5G device-centric networks, UE discovery has many of the same functionalities as the cell search procedure in current 4G cell-centric networks. For instance, there is symbol and frequency synchronization in order to demodulate the control and data channels, there is acquisition of frame timing of the cell, and there is determining the physical-layer cell identity Different levels of network involvement enable the UE discovery to be autonomous, network assisted, or network controlled. Virtualized radio access envisions an always-on connection state that relies on device-centric dedicated connection signatures (DCSs) that enable network-wide or region-based tracking of UEs. Due to mobility, network topology changes, therefore the UEs must update their neighbor's list periodically. Since many devices may simultaneously send their discovery signals, the discovery signals should not suffer from near-far effect, multiple discovery signals should be distinguishable, and energy consumption and UE battery drainage are important considerations as well.

SUMMARY OF THE INVENTION

This disclosure is directed to differential peak signaling in device-centric radio access networks.

In one embodiment, a method of operating a device in a wireless communication network including a plurality of devices comprises generating a signaling message containing information representing a two-dimensional time-frequency grid consisting of a plurality of subcarriers in the frequency domain and a plurality of time slots (TSs) in the time domain together defining resource elements (REs). A subset of the REs is coded to create a signaling message. A first device sends the signaling message to a second device.

In some embodiments, the first device and the second device may be a UE or a BS. In some embodiments, the signaling message is configured to enable discovery of a first UE by a second UE or a BS, or to send other signaling information intended for a second UE or the BS In some embodiments, selected subcarriers in the signaling message are energized to have a radio frequency (RF) power greater than an RF power of other said subcarriers in the signaling message. The method establishes a relative distance between consecutively energized subcarriers in the signaling message to encode the signaling message, wherein the signaling message can be indicative of a signature of the first UE, such as a dedicated connection signature (DCS). A relative location of the energized REs in the signaling message is indicative of a value of the first UE DCS. In some embodiments, the REs are coded according to a maximum distance separable (MDS) code to distinguish the first UE DCS, wherein the MDS code may be a Reed-Solomon (RS) code. Only one RE is coded per orthogonal frequency-division multiplexing (OFDM) symbol and no data is modulated on a coded said RE, or some data is coded on the RE as long as the energized subcarrier can be detected. The first UE periodically generates the signaling message corresponding to its DCS. The first UE has a transmitter that uses a majority of its transmit power to generate the energized subcarriers. In some embodiments, the signaling message is mapped to an uplink time-frequency grid every P frames, wherein P is selectively configurable. A second said UE receives the signaling message and identifies the first UE as being proximate the second UE In another embodiment, a user equipment (UE) is configured to operate in a wireless network including a base station (BS), the UE comprising a message generator configured to generate a signaling message containing information representing a two-dimensional time-frequency grid consisting of a plurality of subcarriers in the frequency domain and a plurality of time slots (TSs) in the time domain together defining resource elements (REs). A subset of the REs is coded to create a discovery signal configured to signaling message intended for a second UE or the BS In some embodiments, the signaling message enables discovery of the UE by another UE or the BS In some embodiments, the message generator is configured to select and energize subcarriers in the signaling message to have a radio frequency (RF) power greater than an RF power of other said subcarriers in the signaling message. The message generator is configured to establish a relative distance between consecutively energized said subcarriers in the signaling message to encode the discovery signal, wherein the discovery signal is indicative of a signature of the first UE, such as dedicated connection signature (DCS). A relative location of the energized REs in the signaling message is indicative of a value of the first UE DCS. In some embodiments, the message generator is configured to code the REs according to a maximum distance separable (MDS) code to distinguish the first UE DCS, wherein the MDS code may be a Reed-Solomon (RS) code. Only one RE is coded per orthogonal frequency-division multiplexing (OFDM) symbol and no data is modulated on a coded said RE. The message generator is configured to periodically generate the signaling message of the UE corresponding to its DCS. The UE has a transmitter that is configured to use a majority of its transmit power to generate the energized subcarriers. The signaling message is configured to be mapped to an uplink time-frequency grid every P frames, wherein P is selectively configurable. The DCS is configured to be managed by a base station (BS).

In another embodiment, a base station (BS) is configured to operate in a wireless network including at least one user equipment (UE), and comprises a message generator configured to generate a signaling message. The signaling message contains information representing a two-dimensional time-frequency pattern consisting of a plurality of subcarriers in the frequency domain and a plurality of time slots (TSs) in the time domain together defining resource elements (REs), wherein a subset of the REs are coded to create a signaling message intended for at least one UE.

In another embodiment, in a wireless communication network comprising a plurality of user equipment (UE) and a base station (BS), a method comprises a first UE or a BS generating a signaling message containing information representing a pattern consisting of either a plurality of subcarriers in the frequency domain or a plurality of time slots (TSs) in the time domain together defining resource elements (REs), wherein a subset of the REs are coded to create a signaling message intended for a second UE or a BS.

In some embodiments, the signaling message pattern is encoded in a plurality of subcarriers in the frequency domain. In another embodiment, the signaling message pattern is encoded in a plurality of time slots (TSs) in the time domain.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 1 illustrates a wireless communications system including UEs and BSs operable according to this disclosure;

FIGS. 2A and 2B illustrate example devices including UEs that may implement the methods and teachings according to this disclosure;

DETAILED DESCRIPTION OF ILLUSTRATIVE EMBODIMENTS

Figure 3:
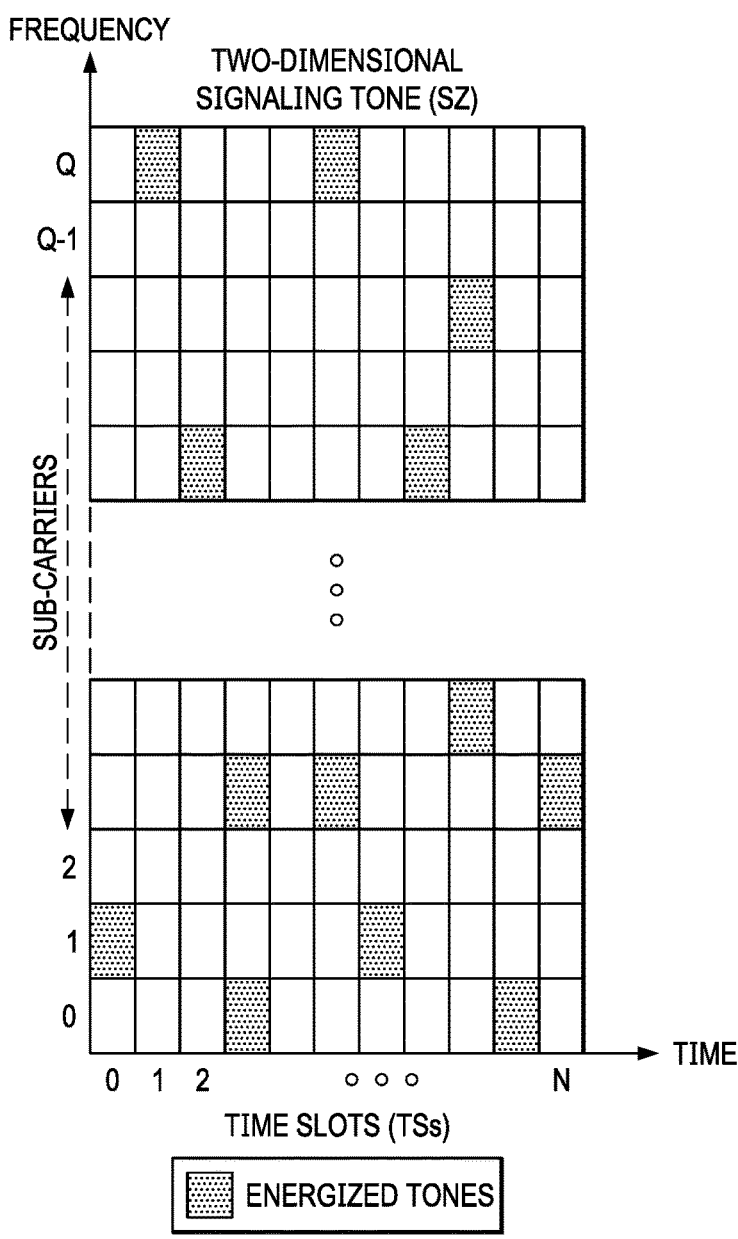
FIG. 3 illustrates dedicated time-frequency signaling resources referred to as a signaling zone according to this disclosure.

FIG. 1 illustrates an example communication system 100 that uses differential peak signaling in device-centric virtual radio access networks according to this disclosure. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals or wired signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration, and can further include the EPC illustrated in any of the figures herein.

FIGS. 2A and 2B illustrate example devices that may implement the methods and teachings according to this disclosure. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver. Those skilled in the art will appreciate that transceiver 202 may be replaced with a transmitter and a receiver. In some embodiments it may be preferable to have individual components for specific design purposes.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

This disclosure consists of a system and method for differential signaling in wireless networks using relative distance between sequentially energized tones to encode signaling information and maximum distance separable (MDS) codes to distinguish between different signaling messages, such as Reed-Solomon (RS) codes. This disclosure benefits by energizing (boosting tone power) to help improve range and supports device-centric unified random access. The disclosure uses relative distance between energized subcarriers to achieve robustness to frequency offset errors. RF-based discovery is utilized, as opposed to location based discovery thereby providing accurate neighbor discovery. The disclosure can exploit the inherent link margin in transmission techniques such as those specified in long term evolution (LTE) to transmit the signaling messages concurrently with data transmissions, and can leverage the time-frequency abstraction of orthogonal frequency-division multiple access (OFDMA) to localize the interference caused by signaling messages to the data packets. It is not necessary for coding or modulation to be used, which can simplify receiver design since no channel estimation is needed. This disclosure avoids heavy beacon signals, such as preamble, pilots, or modulation/coding. Network assisted signaling provides tight interference and quality of signal (QoS) control and the ability to track UEs. There is no need for dedicated resources for signaling which saves on the scarce spectrum.

This disclosure can advantageously use a differential signaling method for wireless networks. This includes determining the relative distance between consecutively energized tones to encode signaling information, and using MDSs codes to distinguish between different signaling messages. The NW manages assignments of DCSs which can be reused over different geographical regions.

Signaling Zone.

Referring to FIG. 3, there is shown a signaling a signaling zone (SZ) which can be used to signal DCSs of a UE to other UEs and/or the BS. The SZ comprises a two-dimensional time-frequency grid. In an implementation where the underlying radio technology is based on LTE, and where LTE terminology is used, the SZ consists of Q subcarriers in the frequency domain, and N time slots in the time domain. The SZ contains (Q*N) resource elements (REs) where N≤Q. The SZ is periodically mapped to the uplink time-frequency grid every P LTE frames, where P is a configurable parameter that can be optimized to minimize the duty cycle for uplink signaling. For example, P=10, N=14 (1 subframe) thus the duty cycle ~1/100=1%. If the number of subcarriers in the signaling zone Q is less than the total number of subcarriers, then the percentage of LTE resources used for signaling is actually less than the duty cycle i.e. <=1%. One possibility is that NW can multicast discovery DCS subgroup information depending on UE relative position to further reduce the detection complexity and size of SZ.

Signaling Method.

DCS is used to identify UEs within a geographical region either for UE discovery purposes or random access procedures. The signaling messages are transmitted over the SZ and each UE periodically broadcasts a signaling message corresponding to its DCS using the SZ resources by energizing a number of REs within the signaling zone. Only 1 subcarrier per orthogonal frequency-division multiplexing (OFDM) symbol is energized and no information is modulated onto that subcarrier. There is no need for channel estimation at the receiver as a simple energy detector is sufficient. The relative location of the energized REs in the SZ is used to indicate the value of the DCS. The relative subcarrier position of the energized tones is used to encode information.

For example, if a UE sequentially energizes subcarriers 3 and 18, then the difference 18−3=15, and subcarrier 15 is used to encode the DCS information. D2D transmissions are not necessarily synchronized, thus using the relative position of subcarriers in the SZ to encode DCS information is very suitable because it provides robustness against carrier frequency offset errors. Discovery/random access signals start by energizing a pre-designated subcarrier in the first TS of the SZ, then any deviation relative to the start-of-signal subcarrier is used as an estimate of the frequency offset between the transmitting and the receiving UEs. Because this disclosure uses the relative distance between subcarriers to encode the DCSs, such an estimate of the frequency offset can be accounted for during the decoding process.

Peak Detection.

If the UE transmitter focuses all its power, or substantially all its power, on a single subcarrier, the energized tone has much more power relative to data transmission. Therefore, the energized tone's position in the time-frequency OFDM grid is easily detected using a simple peak detector at the receiver.

One simple peak detector consists of computing a differential local average according to e.g.:

$$D(i, j) = \frac{1}{(2N+1)^2 - 1} \sum_{m,n=-N}^{N} (|y(i, j)| - |y(i-m, j-n)|)$$

where N is a positive integer and y(i,j) is the received signal on coordinate (i,j If D(i,j) is larger than some empirical threshold T, there it is likely to be an energized tone at coordinate (I,j).

Separability with MDS Codes.

In order to be able to distinguish between different DCSs at the receiver, each signaling message is coded using a deterministic sequence according to a MDS code. For instance, Reed-Solomon (RS) codes are non-trivial MDS codes. The RS codes are deterministic non-binary linear block codes that can be constructed for any Galois Field (GF) of size Q, values of K, N such 1<=K<N<=Q.

The minimum distance for any two RS codewords is the maximum possible, i.e. dmin=N−K+1, thus matching the Singleton Bound for linear codes. There is a close relationship between decoding of RS codes and nonlinear recovery of sparse signals from narrowband data.

Other interesting properties of RS codes include that: RS codes can correct up to $$t = \left\lfloor \frac{d_{min} - 1}{2} \right\rfloor = \left\lfloor \frac{N-K}{2} \right\rfloor$$

(if error locations are not known in advance);

RS codes can correct up to $\rho = d_{min} - 1 = N - K$ symbol erasures (location is known in advance); and RS codes can correct up $2\alpha + \gamma < d_{min}$ simultaneous symbol errors and symbol erasures ($\alpha$ is the number of symbol error patterns and $\gamma$ is the number of symbol erasure patterns).

Encoding of Signal Messages.

Let the number of subcarriers in the SZ be $Q=2^q$ where q is a prime number and let the number of bits representing one discovery/random access signal, be K $\log_2(Q)$=Kq bits where K≤N. Therefore, the number of signaling messages supported by the system is $2^{Kq}=Q^K$.

GF (Q) is a finite field of size Q where Q is usually a prime power, i.e. p^n where p is a prime number and n is a positive integer. It is also called Galois Field, hence the abbreviation GF(Q). This is an algebraic concept designating a finite set for which the commutative operations of multiplication, addition, subtraction and division (by anything except zero) are defined. For example, the set of integers modulo 3 is a Galois field.

In GF(Q), one signal c=[$c_0, c_1, \ldots, c_K$]. corresponding to the message symbols $\{c_0, c_1, \ldots, c_K\} \subseteq GF(Q)$ can be represented by the polynomial $$C(X) = \sum_{j=0}^{K-1} c_j X^j$$

Let A=$\{\alpha_1, \alpha_2, \ldots, \alpha_N\} \subseteq GF(Q)$ s.t. $\alpha_i \neq \alpha_j \forall 1 \leq i \neq j \leq N$
Then a RS code can be defined as:

$$RS_{GF(Q),A}[N, K] = \left\{ [P(\alpha_1), P(\alpha_2), \ldots, P(\alpha_N)] \in (GF(Q))^N \mid P(X) \text{ is a polynomial in } GF(Q) \text{ with degree} \leq K - 1 \right\}$$

The generator matrix for the RS code $RS_{GF(Q),A}[N,K]$ is the N×K Vandermonde matrix $$V = [\alpha_i^j]_{i=1,\ldots,N}^{j=0,\ldots,K-1}$$

Decoding of Signaling Messages

Let S be the set of simultaneously transmitted discovery/random access messages, the number of possible combinations causing ambiguity at the receiver is $|S|^K$ where |•| denotes the Cardinality operator Dirichlet Principle:

If N peaks are selected (one peak per OFDM symbol for each TS of a signaling period of size N), then at least $$\left\lceil \frac{N}{|S|} \right\rceil$$

peaks belong to the same signaling message.

Because RS codes are MDS codes then in case of perfect peak detection, the receiver will be able to uniquely map the signaling messages to the correct DCSs provided that $$\left\lceil \frac{N}{|S|} \right\rceil > K - 1$$

Superimposed Uplink Data Traffic

An additional advantage of network-assisted UE discovery using peaked tones where UEs register their DCS with the network is that the SZ need not be exclusively dedicated for signaling.

Other UEs not involved in the discovery/signaling process (some UE classes may not be discoverable) can still use the signaling zone resources to transmit uplink data traffic.

The receiver of the uplink traffic data is the BS. The BS is aware of the DCSs currently being transmitted (active DCSs). Accordingly, the receiver can use this information to erase the data symbols that happen to coincide with the energized tones of the active DCSs.

The decoder at the BS treats the demodulated bits for the energized tones as bit erasures which are easier to deal with than bit errors and usually require fewer redundancy bits to correct.

Moreover, LTE-based systems often err on the conservative side and allow for some link margin to compensate for modulation and coding scheme (MCS) adaptation algorithms and imperfect channel state information (CSI). Therefore, such link margins should be enough to compensate for the erased symbols without sacrificing valuable data resources.

In another embodiment, the BS can broadcast the SZ signaling messages on a downlink to a plurality of neighboring UEs or BSs. Similar in the uplink, the differential peak signaling method can also be used to signal traffic priority, and assist in downlink inter-cell interference coordination, interference avoidance and TP muting for energy saving purposes.

Figure 4:
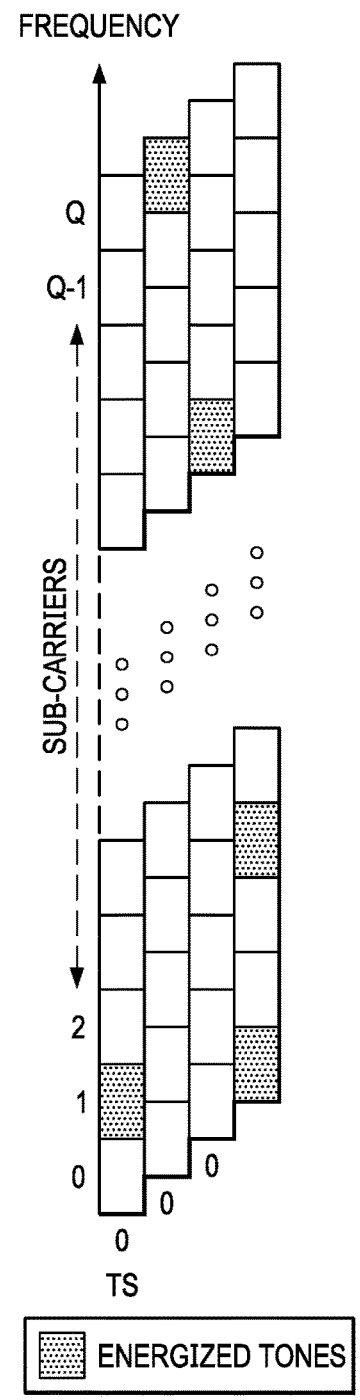
FIG. 4 illustrates signaling resources configured in only the frequency domain.

Referring to FIG. 4, according to another embodiment of this disclosure, frequency domain signaling of the SZ can comprise of a plurality of REs coded in only the frequency domain. The different columns in FIG. 4 use different contiguous chunks of Q subcarriers in the frequency domain. The differential encoding in this embodiment is between the relative positions of subcarriers in two consecutive chunks of Q subcarriers in the frequency domain. The REs are encoded in multiple subcarriers for a single time slot, shown in this example as time slot 0. As described above, the deviation relative to the start-of-signal subcarrier can be used as an estimate of the frequency offset between the transmitting and receiving devices. The relative distance between subcarriers encodes the UE signature, such as the UE DCS.

Figure 5:
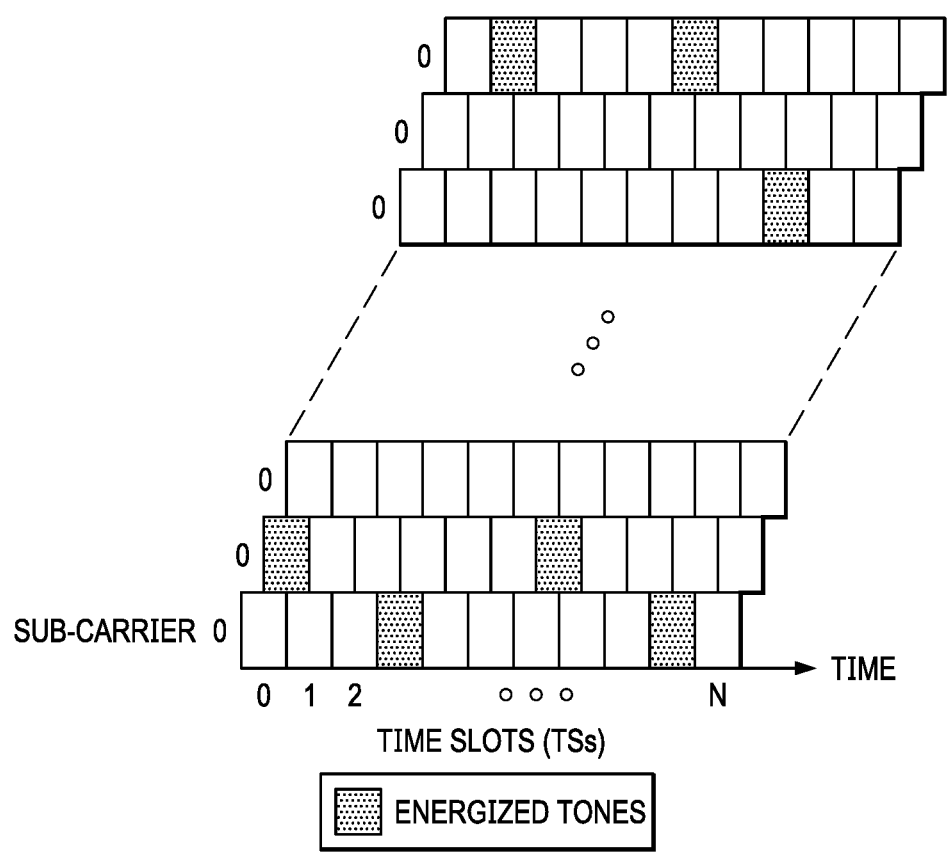
FIG. 5 illustrates the signaling resources configured in only the time domain.

Referring to FIG. 5, according to another embodiment of this disclosure, time-domain signaling of the SZ can comprise of a plurality of REs coded in only the time domain. The different rows in FIG. 5 use different contiguous chunks of time slots in the time domain. The REs are encoded in multiple timeslots for a single subcarrier, shown in this example as subcarrier 0. The time-domain only signaling is perhaps a less interesting proposition as it has the downside of introducing more delay to the signaling scheme.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   transmitting, by a first device to a second device, a signaling message including signature information identifying the first device, the signaling message transmitted by energizing a first subcarrier in a first time slot and energizing a second subcarrier in a second time slot, the signature information encoded based on a frequency difference between the first subcarrier and the second subcarrier.

2. The method of claim 1, wherein the signaling message is receivable by an energy detector at the second device.

3. The method of claim 1, wherein the signature information comprises a dedicated connection signature (DCS) for identifying the first device.

4. The method of claim 1, wherein the signaling message includes a discovery signal configured to enable discovery of the first device by the second device.

5. The method of claim 1, wherein the first device comprises a user equipment (UE) or a base station (BS).

6. A method comprising:
   receiving, by a second device from a first device, a signaling message including signature information identifying the first device, the signaling message received by a first subcarrier energized in a first time slot and a second subcarrier energized in a second time slot, the signature information encoded based on a frequency difference between the first subcarrier and the second subcarrier.

7. The method of claim 6, wherein the signaling message is receivable by an energy detector at the second device.

8. The method of claim 6, wherein the signature information comprises a dedicated connection signature (DCS) for identifying the first device.

9. The method of claim 6, wherein the signaling message includes a discovery signal configured to enable discovery of the first device by the second device.

10. The method of claim 6, wherein the second device comprises a user equipment (UE) or a base station (BS).

11. A first device comprising:
    a non-transitory memory storage medium comprising instructions; and
    one or more processors coupled to the non-transitory memory storage medium, wherein the one or more processors execute the instructions to:
    transmit, to a second device, a signaling message including signature information identifying the first device, the signaling message transmitted by energizing a first subcarrier in a first time slot and energizing a second subcarrier in a second time slot, the signature information encoded based on a frequency difference between the first subcarrier and the second subcarrier.

12. The first device of claim 11, wherein the signaling message is receivable by an energy detector at the second device.

13. The first device of claim 11, wherein the signature information comprises a dedicated connection signature (DCS) for identifying the first device.

14. The first device of claim 11, wherein the signaling message includes a discovery signal configured to enable discovery of the first device by the second device.

15. The first device of claim 11, wherein the first device comprises a user equipment (UE) or a base station (BS).

16. A second device comprising:
    a non-transitory memory storage medium comprising instructions; and
    one or more processors coupled to the non-transitory memory storage medium, wherein the one or more processors execute the instructions to:

receive, from a first device, a signaling message including signature information identifying the first device, the signaling message received by a first subcarrier energized in a first time slot and a second subcarrier energized in a second time slot, the signature information encoded based on a frequency difference between the first subcarrier and the second subcarrier.

17. The second device of claim 16, wherein the signaling message is receivable by an energy detector at the second device.

18. The second device of claim 16, wherein the signature information comprises a dedicated connection signature (DCS) for identifying the first device.

19. The second device of claim 16, wherein the signaling message includes a discovery signal configured to enable discovery of the first device by the second device.

20. The second device of claim 16, wherein the second device comprises a user equipment (UE) or a base station (BS).

* * * * *